July 16, 1968

P. E. BRAUN ET AL 3,392,714

FUEL METERING SYSTEM

Filed June 20, 1966

PAUL E. BRAUN
SUNE E. TIMOUR
INVENTORS

BY John R. Faulkner
Glenn S. Arendsen

ATTORNEYS

PAUL E. BRAUN
SUNE E. TIMOUR
INVENTORS

PAUL E. BRAUN
SUNE E. TIMOUR
INVENTORS

BY John R. Faulkner
Glenn S. Arendsen
ATTORNEYS

United States Patent Office 3,392,714
Patented July 16, 1968

3,392,714
FUEL METERING SYSTEM
Paul E. Braun, Birmingham, and Sune E. Timour, Garden City, Mich., assignors to Ford Motor Company, Dearborn, Mich., a corporation of Delaware
Filed June 20, 1966, Ser. No. 558,954
15 Claims. (Cl. 123—119)

ABSTRACT OF THE DISCLOSURE

An air pump driven by an engine produces air flow in a passage distinct from the engine induction system and the air flow in this passage is used to generate signals corresponding to the engine operating conditions for controlling the amount of fuel supplied to the engine. The inlet passage for the air pump contains a venturi and a blade linked to the conventional throttle blade located in the engine air induction system, and the outlet passage contains a back pressure valve designed to simulate engine back pressure. Signals drawn from several points in the inlet and outlet passages, e.g., the venturi throat, the space between the venturi throat and the blade, are transmitted to fuel metering valves that control the amount of fuel bypassing the injection nozzles and thereby control injection pressures.

---

This invention provides a fuel metering system for an internal combustion engine in which a signal generating means is driven by the engine to generate the signals that determine the amount of fuel required for a proper fuel-air ratio. The invention is useful particularly in fuel injection engines.

Air flowing through a venturi in the air induction system of most current production engines produces a main metering signal that determines the fuel supplied to the engine. A modifying signal produced by the manifold vacuum modifies the main metering signal to accommodate changes in fuel requirements caused by the engine loads varying between maximum power operation and maximum economy operation.

In an engine designed to operate in a narrow speed range, one or more venturis in the air induction system of the engine provide an adequate signal for fuel metering at the low end of the speed range while only slightly restricting air flow at the high end. An engine having a broader speed range requires additional venturis in secondary induction passages that open at higher speeds to avoid serious restrictions to air flow.

However, an air induction system having venturis therein is incapable of economically providing an adequate compromise for engines designed to operate over broad speed ranges of above about 4,000 r.p.m. such as the speed ranges of 8,000 or 9,000 r.p.m. encountered in racing engines, because a venturi capable of providing an adequate signal at the low speeds produces a serious restriction to air flow at high speeds and, conversely, a venturi causing a low restriction to air flow at the high speeds cannot provide an adequate signal at low speeds. In addition, the broad range of air and fuel flow rates in the engine complicates accurate calibration of the fuel metering device in response to the main metering and the modifying signals at all air and fuel flow rates.

In the fuel metering system provided by this invention the signal generating means controlling the supply of fuel is separated from the air induction system of the engine. A venturi is not required in the air induction passage and air flow to the engine is unrestricted except for a conventional throttle valve necessary for part throttle operation. Stronger metering signals and more accurate calibration of fuel-air ratios to engine requirements at all engine speeds are possible with the metering system of this invention.

In an internal combustion engine having an air induction passage for supplying air to a combustion chamber of the engine and a fuel supply means for supplying fuel to the combustion chamber, the fuel metering system of this invention comprises a signal generating means driven by the engine and means responsive to the signal generating means for controlling the supply of fuel provided by the fuel supply means. The signal generating means can be a small constant displacement air pump mounted externally on the engine and driven by the engine camshaft or crankshaft either directly or through gearing. Fluids other than air can be used in the signal generating pump, but since the engine breathes air, calibration and installation are simplified when the signal generating pump pumps air.

Details of construction and operation of the fuel metering system of this invention are presented in the following description of the system shown in the drawings in which.

Figure 4:
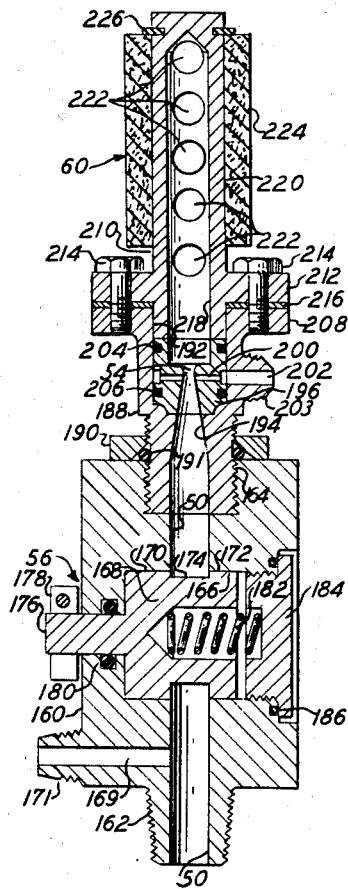
Figure 5:
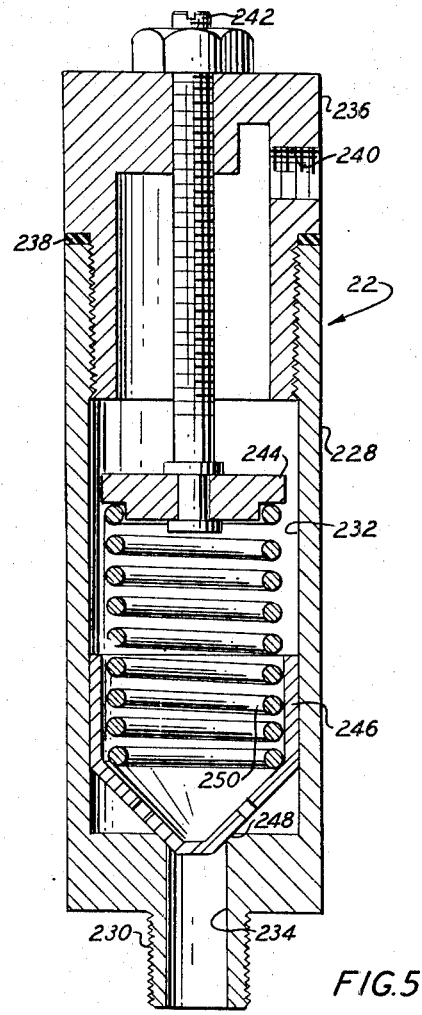

FIGURE 4 shows an intake passage for the air pump that contains a venturi used to generate a main fuel metering signal and a regulating means used for part throttle engine operation; and FIGURE 5 shows a check valve that can be mounted between the fuel pump outlet and the fuel injection nozzles for adjusting injection pressures at low engine speeds without affecting the higher injection pressures at higher engine speeds. This valve also improves deceleration fuel flow rates.

Figure 1:
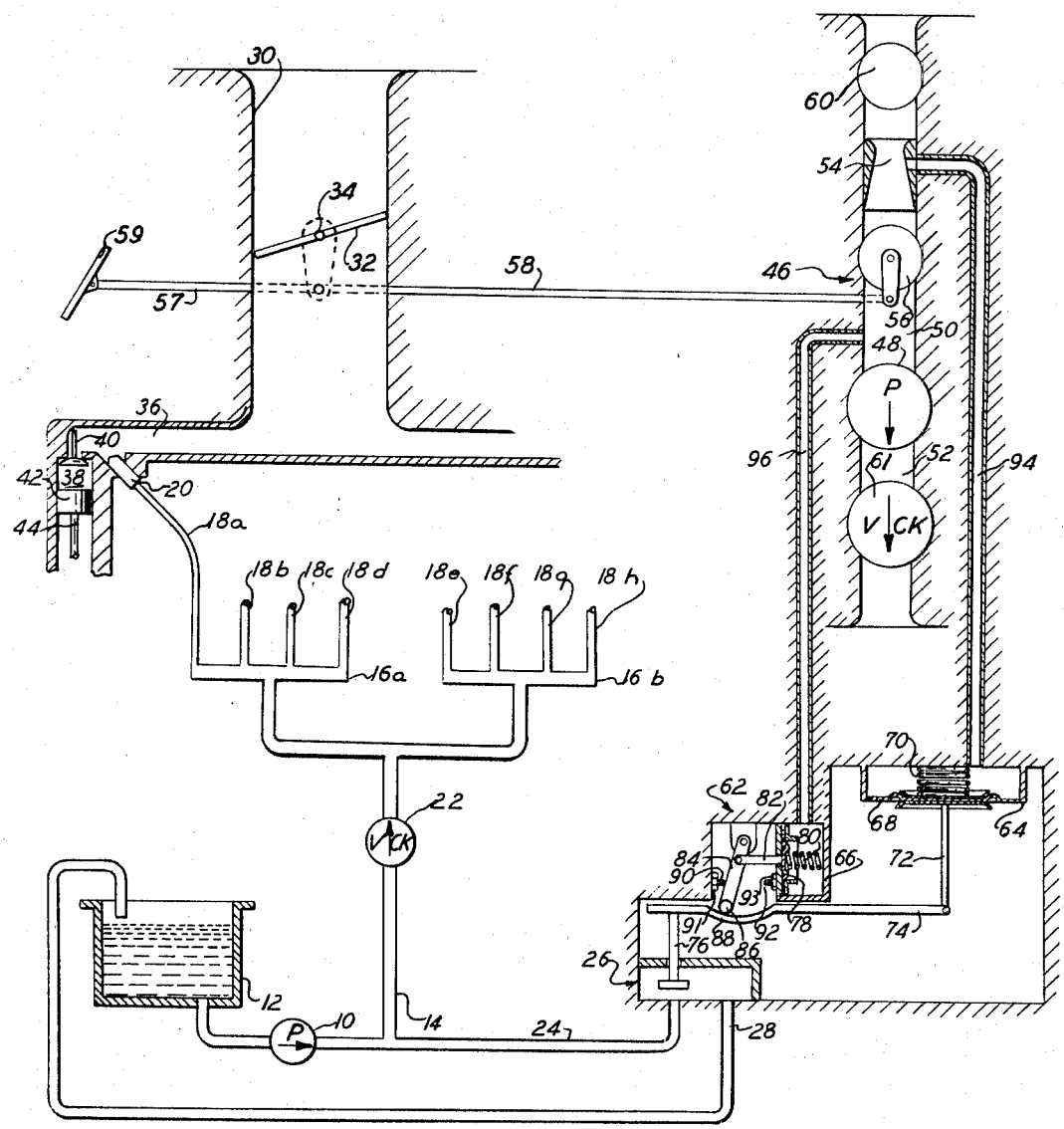
FIGURE 1 is a schematic diagram of an air and fuel supply system for a fuel injection engine that comprises the fuel metering system provided by this invention.

Referring to FIGURE 1, the fuel supply means for a fuel injection engine using the fuel metering system of this invention comprises a constant displacement fuel pump 10 having its inlet connected to a fuel tank 12. The outlet of fuel pump 10 is connected through a high pressure fuel line 14, a distributing block 16a, and a fuel distributing line 18a to a fuel injection nozzle 20. For simplicity, only one injection nozzle 20 is shown, it being understood that the other distributing lines 18b, 18c, and 18d attached to metering block 16a along with distributing lines 18e to 18h attached to distributing block 16b supply similar injection nozzles appropriately located to supply fuel to the other engine combustion chambers of an eight cylinder engine. A check valve 22 can be located in high pressure line 14 between a fuel pump 10 and nozzle 20 if desired.

The outlet of fuel pump 10 also is connected to a spill valve line 24 that leads to a spill valve indicated generally by the numeral 26. A return line 28 has one end connected to spill valve 26 and the other end adapted to return fuel to fuel tank 12.

An air induction passage 30 shown schematically in FIGURE 1 has a throttle valve 32 movably mounted therein on pin 34 in a conventional manner. Note, however, that induction passage 30 does not contain a venturi or any other restricting means. Conventional throttle linkage 57 connects throttle valve 32 with a conventional accelerator pedal 59.

Below throttle valve 32, induction passage 30 branches into an intake manifold passage 36 that is connected to a combustion chamber 38 of the engine. A conventional intake valve 40 controls the communication of passage 36 with combustion chamber 38, and a conventional piston 42 and connecting rod 44 are mounted in combustion chamber 38. Injection nozzle 20 is mounted in the wall of intake manifold passage 36.

A signal generating means indicated generally by the numeral 46 comprises a positive displacement pump 48 having an intake passage 50 and an outlet passage 52 both communicating with the atmosphere. Located in intake passage 50 are a venturi 54 and a regulating means 56. Regulating means 56 controls air flow through venturi 54 and pump 48 and is connected by a link 58 to throttle valve 32. A filter 60 is mounted in the inlet to intake passage 50. Mounted in outlet passage 52 is a back pressure valve 61.

A fuel meter indicated generally by the numeral 62 has mounted therein first and second diaphragm cages 64 and 66, respectively. First diaphragm cage 64 contains a diaphragm 68 spring loaded by a spring 70 urging diaphragm 68 out of cage 64. An arm 72 is attached at one end to diaphragm 68 and at its other end to a lever 74. Lever 74 is attached to a spill valve member 76 mounted in spill valve 26.

Second diaphragm cage 66 contains a diaphragm 78 that is spring loaded by spring means 80 to an outer position. An arm 82 is attached at one end to diaphragm 78 and at its other end to the center portion of a lever 84. One end of lever 84 is anchored pivotally to the housing of fuel meter 62 and the other end has a cam 86 that contacts an arcuate surface 88 of lever 74. A threaded member 90 is threaded into the housing of fuel meter 62 adjacent one end of an arc that lever 84 can swing through, and a similar threaded member 92 is threaded into the housing adjacent the other end of this arc. Lock nuts 91 and 93 threadably engage threaded members 90 and 92, respectively, and the seat on the housing of fuel meter 62 to prevent vibrations from changing the settings of the threaded members. Threaded members 90 and 92 serve as power and economy stops, respectively, for lever 84.

A signal line 94 connects the throat of venturi 54 with diaphragm cage 64 and a similar signal line 96 connects the portion of intake passage 50 between regulating means 56 and pump 48 with the second diaphragm cage 66.

Figure 2:
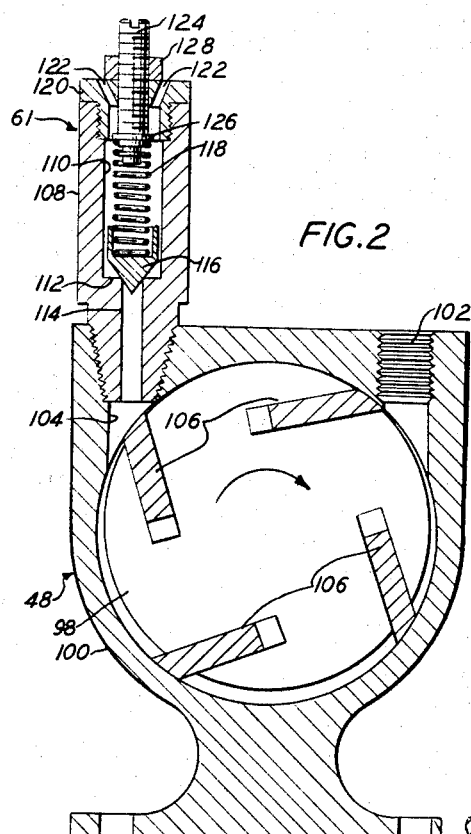
FIGURE 2 shows details of an air pump construction useful as the signal generating means and comprising a back pressure valve that increases calibration flexibility and accuracy.

Referring to FIGURE 2, air pump 48 is a conventional sliding vane type pump and comprises a rotor 98 eccentrically mounted for rotation in a housing 100. Housing 100 has a threaded inlet 102 at one side of rotor 98 and a threaded outlet 104 at the other side. Rotor 98 carries a plurality of vanes 106 that sweep the air space between the eccentrically mounted rotor 98 and housing 100, thereby moving air from inlet 102 to outlet 104.

Threadably mounted in outlet 104 is back pressure valve 61. Back pressure valve 61 comprises a housing 108 that has a bore 110 therein terminating in a valve seat 112. A hole 114 is drilled through housing 108 to connect pump outlet 104 with bore 110. Hole 114 thereby forms a part of the outlet passage 52. An end cap 120 is threaded into the open end of bore 110 and contains air holes 122.

A valve member 116 is mounted in bore 110 and is urged toward seat 112 by spring 118. An adjusting screw 120 extends through end cap 120 and has a retainer 126 attached thereto within bore 110. Spring 118 seats on retainer 126. A lock nut 128 threadably engages adjusting screw 124 and seats on end cap 120 to prevent vibrations from changing the setting of adjusting screw 124.

Figure 3:
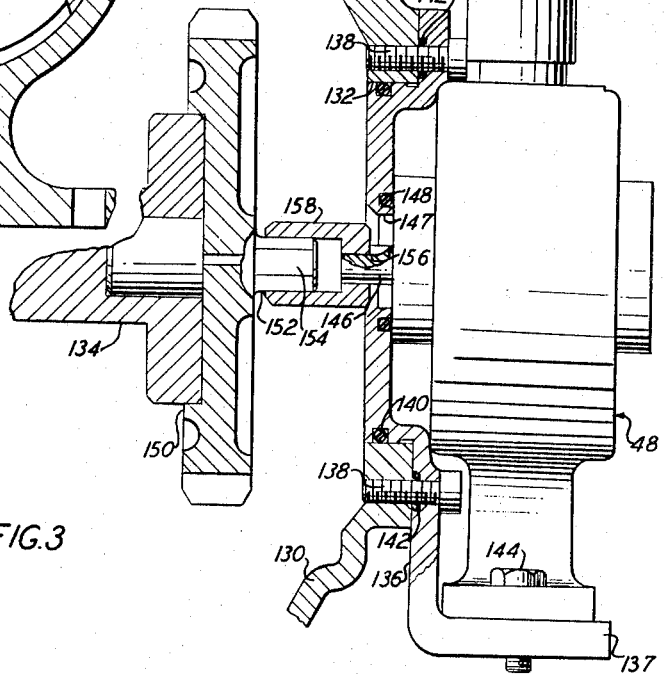
FIGURE 3 shows the air pump of FIGURE 2 mounted at the front of an engine and driven by the engine camshaft.

Turning to FIGURE 3, an engine front cover 130 has a hole 132 cut therein adjacent the end of the engine camshaft 134. A pump mounting bracket 136 having a lower projecting edge 137 is fastened in hole 132 by threaded fasteners 138. O-ring seal 140 seals the surface between bracket 136 and front cover 130 in hole 132, and O-ring seals 142 seal the surfaces around threaded fasteners 138.

Air pump 48 is fastened to bracket 136 at lower projecting edge 137 by threaded fasteners 144 so a drive shaft 146 for rotor 98 projects through a hole 147 in bracket 136 toward camshaft 134. An O-ring seal 148 seals the surface between the housing of air pump 48 and bracket 136 around hole 147.

A camshaft driving gear 150 is mounted on the end of camshaft 134 and is driven by the engine crankshaft by conventional means (not shown). A projection 152 on the outer surface of camshaft driving gear 150 has shaped sides as at 154 to provide driving surfaces. Projection 152 terminates adjacent rotor drive shaft 146 that has a keyway 156 cut therein. A sleeve 158 engages keyway 156 and shaped sides 154 to provide a driving connection between gear 150 and rotor 98 of air pump 48.

FIGURE 4 shows the intake passage 50 of the signal generating air pump 48 that contains an air filter 60, a venturi 54 and a regulating means 56. Regulating means 56 comprises a housing 160 having a portion of intake passage 50 drilled longitudinally therethrough. Screw threads 162 at the bottom of housing 160 are adapted to threadably engage threaded inlet 102 of air pump 48, and a threaded portion 164 at the upper end of housing 160 is adapted to engage the portion of intake passage 50 containing venturi 54.

A bore 166 is cut into housing 160 transverse to passage 50. A cylindrical spool-shaped valve 168 having shoulders 170 and 172 at each end is mounted in bore 166 with shoulders 170 and 172 locating valve 168 therein for rotational movement. Between shoulders 170 and 172 is an intermediate portion 174 that is contoured to provide a variable restriction to air flow through passage 50 depending on the rotational position of valve 168.

Valve 168 has an integrally formed shaft 176 at one end thereof that projects through housing 160. Shaft 176 is attached externally of housing 160 to a regulating means control arm 178 that in turn is attached to link 58 shown in FIGURE 1. An O-ring seal 180 seals the surface between housing 160 and shaft 176. Valve 168 is held in position by a spring 182 mounted in a cavity drilled in the end of valve 168 opposite shaft 176. Spring 182 seats on a plug 184 threaded into the open end of bore 166 and sealed therein by O-ring 186. Below valve 168, a signal tap 169 is drilled into housing 160 to communicate with passage 50. Tap 169 opens through a fitting 171 to which signal line 96 shown in FIGURE 1 connects.

Threadably attached to housing 160 by threaded means 164 is a housing 188 for the venturi 54. A lock nut 190 threadably engages housing 188 and bears on the top of housing 160 to lock housing 188 and housing 160 together. O-ring seal 191 is held in place by lock nut 190 and seals the surface between housing 160 and housing 188.

The upper part of housing 188 contains an enlarged bore 192 and the lower part of housing 188 is contoured as at 194 to provide a smooth flow recovery path from venturi 54. A venturi member 196 containing venturi 54 is positioned in bore 192. Venturi member 196 has a signal tap 200 extending therethrough to the throat of venturi 54 and communicating with a passage 202 formed in a fitting 203 on the side of housing 188. Signal line 94 shown in FIGURE 1 attaches to fitting 203. O-rings 204 and 206 seal the surface between venturi member 196 and bore 192 above and below signal tap 200, respectively.

A flange 208 is formed at the upper end of housing 188. Filter means 60 comprises a filter support 210 that has a corresponding flange 212. Threaded means 214 pass through flange 212 and threadably engage flange 208 to connect the filter means 60 with venturi housing 188. A gasket 216 seals the surfaces between flange 212 and flange 208.

Filter support 210 has cylindrical portions 218 and 220 extending in opposite directions perpendicular to flange 212. Portion 218 extends below flange 212 into bore 192 and seats on venturi member 196 to hold the latter in position. Cylindrical portion 220 extends above flange 212 and has a plurality of holes 222 drilled through the wall thereof. A conventional filter medium 224 is mounted concentrically around filter support 210 and is held in position by a retaining ring 226 that snaps into a groove at the top of filter support 210. With this construction, venturi member 196 can be removed by loosening threaded means 214, removing filter support 210 from the top of housing 188, and sliding member 196 out of bore 192. An alternate venturi member calibrated, for example, to provide a fuel metering signal proper for a different fuel blend then can be substituted.

Shown in FIGURE 5 are details of check valve 22 that comprises a housing 228 having a threaded inlet 230 at one end and a bore 232 extending into the housing 228 from the other end. A passage 234 through threaded inlet 230 communicates with bore 232. An end closure 236 is threaded into the open end of bore 232 and is sealed thereto by gasket 238. End closure 236 has a threaded outlet 240 on one side and threadably engages an adjusting screw 242 that extends into bore 232. A retainer 244 is mounted within bore 232 on the end of adjusting screw 242.

Slidably mounted in bore 232 is a valve member 246 that is urged toward its seat 248 formed in housing 228 where passage 234 opens into bore 232. A spring 250 seats on retainer 244 and the tension exerted by spring 250 on valve member 246 can be adjusted by turning screw 242.

Operation

Fuel pump 10 pumps fuel from fuel tank 12 through check valve 22 and injection nozzle 20 to intake manifold passage 36 where the fuel mixes with air that has passed through induction passage 30. The air-fuel mixture is inducted into combustion chamber 38 where it performs in a conventional manner to operate the engine. Throttle valve 32 is positioned by a conventional accelerator pedal and controls the amount of air flowing through induction passage 30 for part throttle operation.

The amount of fuel supplied by nozzle 20 depends on the fuel pressure in high pressure line 14. Spill valve 26 controls the fuel pressure in line 14 by providing a bypass through lines 24 and 28 to the fuel tank 12 or the low pressure side of fuel pump 10. Spill valve 26 is positioned by signal generating means 46 which combines with fuel meter 62 to operate in the following manner.

Air pump 48 of signal generating means 46 is driven by the engine and produces air flow through venturi 54. The vacuum produced in the throat of venturi 54 by this air flow is transmitted via signal tap 200, passage 202 and signal line 94 to diaphragm cage 64 in fuel meter 62. Since the speed of air pump 48 is related to engine speed, the air flow through venturi 54 and the vacuum this air flow produces in diaphragm cage 64 also are related to engine speed.

The vacuum in diaphragm cage 64 acts through diaphragm 68 and arm 72 to pivot lever 74 about cam 86 and thereby control the position of spill valve member 76 that in turn controls the fuel flow through spill valve 26. At low engine speeds, pump 48 produces a low vacuum in diaphragm cage 64 and spring 70 moves spill valve member 76 upward in FIGURE 1, thereby permitting a large amount of fuel to pass through the bypass lines. At higher engine speeds pump 48 produces a higher vacuum in cage 64 that rotates lever 74 counter-clockwise about cam 86, moving spill valve member 76 downward in FIGURE 1 to restrict bypass fuel flow.

The throttle valve 32 disposed in induction passage 30 and the regualting means 56 disposed in intake passage 50 of pump 48 combine to provide part throttle engine operation. Calibrating the opening of intermediate portion 174 of regulating valve 168 of regulating means 56 with the opening of throttle valve 32 to proportion air flow through venturi 54 to air flow through engine induction passage 30 produces a signal in diaphragm cage 64 that meters sufficient fuel through spill valve 26 to produce the proper injection pressure across nozzle 20. Intermediate portion 174 is shaped to provide the fuel-air ratio desired at each engine speed.

After spill valve 26 is calibrated to the signal produced in cage 64 by venturi 54 as described, the fuel-air ratio of the mixture supplied to the engine at any engine speed is constant regardless of the load on the engine. For the maximum engine power output desired in handling high engine loads, increasing the fuel-air ratio is necessary along with increases in the amounts of fuel and air. With lower engine loads occurring, for example, during road load operation or engine deceleration, a decreased fuel-air ratio can be tolerated by the engine and provides maximum fuel economy. At higher engine loads, the driver depresses the accelerator pedal 59 to increase engine power output while at lower engine loads the driver releases the accelerator pedal. The vacuum existing between regulating means 56 and air pump 48 is responsive to engine loads because depressing the accelerator pedal 59 decreases the restriction provided by regulating means 56 to air flow in passage 50, thereby decreasing this vacuum. Conversely, releasing pedal 59 increases the restriction to increase the vacuum. This vacuum is used to modify the fuel-air ratio provided by the fuel metering system in accordance with the engine load in the following manner.

Signal line 96 applies the vacuum to diaphragm cage 66 where it acts through diaphragm 78 and arm 82 to control the position of lever 84 and cam 86. Cam 86 moves on arcuate portion 88 of lever 74 to establish the pivot point of lever 74, thereby modifying the effect of the main metering signal produced in diaphragm cage 64 on spill valve member 76.

At low engine speeds under part throttle operation, regulating valve 168 is partially closed and air pump 48 produces a high vacuum in intake passage 50 between regulating means 56 and pump 48. This high vacuum moves diaphragm 78 to the right in FIGURE 1, and diaphragm 78 acts through arm 82 to move cam 86 also to the right. This changes the pivot point of lever 74 which moves spill valve member 76 slightly upward, thereby permitting a larger amount of fuel to flow through spill valve 26. The resulting decrease in injection pressure at nozzle 20 decreases the fuel-air ratio to an economic level. Threaded member 92 establishes maximum movement of lever 84 to the right, thereby serving as an economy stop.

When increased engine load necessitates increased engine power output, regulating valve 168 is opened further by the accelerator linkage, thereby decreasing the vacuum existing between regulating means 56 and air pump 48. The correspondingly decreased vacuum in diaphragm cage 66 permits spring 80 to move lever 84 and cam 86 toward the left in FIGURE 1, thereby moving the pivot point of lever 74 to the left. This closes spill valve 26 slightly and increases the injection pressure, thereby increasing the fuel-air ratio. Threaded member 90 limits maximum movement of lever 84 to the left, thereby serving as a power stop.

A momentarily increased amount of fuel is required in most engines at the beginning of an acceleration to compensate for the lower inertia of fuel when compared with air. When regulating valve 168 is opened to begin an acceleration, a momentary surge of air flowing through venturi 54 produces a momentarily large increase in the vacuum in diaphragm cage 64 that closes slightly spill valve 26. This effect combines with the decreased vacuum in diaphragm cage 66 to aid in supplying the momentarily increased amount of fuel, thereby eliminating the need for the accelerator pump required by air and fuel supply systems having a venturi in the engine air induction passage.

Pump 48, regulating means 56, and venturi 54 can be calibrated so the vacuum produced between regulating means 56 and pump 48 is proportional to engine manifold vacuum under all engine operating conditions. Signal line 96 then can be connected to the engine intake manifold instead of intake passage 50 if desired. Back pressure valve 61 decreases slightly the vacuum appearing between pump 48 and regulating means 56 at low engine speeds without significantly affecting the vacuum at higher engine speeds, thereby simulating actual engine breathing and assisting in calibration. Adjusting screw 124 provides adjustment of back pressure valve 62.

In many fuel injection systems, difficulties are encountered in regulating the low injection pressures required for idling. Check valve 22 located between fuel pump 10 and injection nozzle 20 provides a restriction to low fuel flow rates but does not affect significantly the higher fuel flow rates. Adjustment of check valve 22 thereby permits adjustment of the idling injection pressure without affecting injection pressures at higher engine speeds.

A typical air pump 48 pumps about one cubic foot of air per minute and requires about $\frac{1}{20}$ H.P. at maximum engine speed, which is a considerable reduction from the horsepower losses caused by a metering venturi in the air induction passage. In prior art systems, the metering venturi located in the air induction passage must produce the proper fuel metering signal from an air flow rate predetermined by the engine requirements. In this invention, however, air flow through the signal generating means 46 can be varied by varying the size of pump 48, for example. Because of this additional parameter, the fuel supply system provided by this invention permits more accurate calibration of fuel-air ratios for a wider variety of engine operating conditions.

It is emphasized that the invention is not limited to the exact constructions shown or described but that changes and modifications can be made without departing from the spirit and scope of the invention as defined in the claims.

What is claimed is:

1. In an internal combustion engine having an air induction passage for supplying air to a combustion chamber of the engine and a fuel supply means for supplying fuel to the combustion chamber, a fuel metering system comprising
    means for simulating the rate weight of air flow to the engine having signal generating means including an air pump driven by the engine, said air pump having an inlet passage and an outlet passage, said inlet and outlet passages communicating with the atmosphere, said signal generating means being in one of said passages and producing a response which bears a parallel relationship with air flow in the air induction system of the engine, and
    means responsive to the air flow produced by said air pump for controlling the supply of fuel to the combustion chamber.

2. The fuel metering system of claim 1 comprising a throttle valve mounted in said induction passage, and a regulating means controlling the air flow through the air pump, said regulating means being linked to said throttle valve.

3. The metering system of claim 2 in which the inlet passage contains a flow constriction means, said flow constriction means generating a first signal that controls the supply of fuel to the combustion chamber.

4. The metering system of claim 3 in which the regulating means is located in the inlet passage downstream of the flow constriction means and comprising means responsive to the air pressure between the regulating means and the air pump for generating a second signal that modifies the supply of fuel to the combustion chamber.

5. The metering system of claim 4 in which the fuel supply means comprises a fuel pump having its outlet connected to a fuel injection nozzle and a fuel bypass circuit, and
a fuel valve controlling fuel flow through said bypass circuit, said fuel valve being positioned by signals generated by said air pump.

6. The metering system of claim 5 in which the outlet passage contains a back pressure valve.

7. The metering system of claim 6 comprising a check valve between the fuel pump and the fuel injection nozzle for controlling the fuel injection pressure at low engine speeds.

8. The metering system of claim 1 in which the inlet passage contains a flow constriction means, said flow constriction means generating a first signal that controls the supply of fuel to the combustion chamber.

9. The metering system of claim 8 comprising means for generating a second signal that modifies the supply of fuel to the combustion chamber.

10. The metering system of claim 1 in which the fuel supply means comprises
    a fuel pump having its outlet connected to a fuel injection nozzle and a fuel bypass circuit, and
    a fuel valve controlling fuel flow through said bypass circuit, said fuel valve being positioned by the signal generating means.

11. The metering system of claim 10 comprising a check valve between the fuel pump and the fuel injection nozzle for controlling the fuel injection pressure at low engine speeds.

12. In an internal combustion engine, a fuel and air supply system that comprises
    an air induction passage for supplying air to a combustion chamber of the engine,
    throttle valve means for controlling air flow through said induction passage,
    means including a constant displacement fuel pump for supplying fuel from a fuel source to the combustion chamber,
    an air pump driven by the engine, the air moved by said air pump being distinct from the air passing through the combustion chamber of the engine, the speed of said pump being proportional to the speed of the engine,
    valve means for controlling the flow of air through said air pump, said valve means being linked to said throttle valve means, and
    fuel valve means responsive to a signal generated by the air flow produced by said air pump for controlling the supply of fuel to the combustion chamber.

13. The supply system of claim 12 in which the air pump produces air flow through a venturi and the fuel valve means is responsive to the signal generated by said venturi.

14. The supply system of claim 13 in which the fuel valve means also is responsive to the air pressure between the air valve means and the air pump.

15. The supply system of claim 14 in which the fuel valve means controls fuel flow through a bypass circuit returning fuel from the high pressure side of the fuel pump to the fuel source.

References Cited

UNITED STATES PATENTS

| | | | |
|---|---|---|---|
| 2,447,263 | 8/1948 | Mock | 123—119 |
| 2,813,522 | 11/1957 | White et al. | 123—119 |
| 2,957,464 | 10/1960 | Dolza | 123—119 |

LAURENCE M. GOODRIDGE, *Primary Examiner.*